Sept. 23, 1952        R. M. LEHMAN        2,611,329
METHOD AND MACHINE FOR MAKING DOUGHNUTS AND THE LIKE
Filed March 5, 1949        3 Sheets-Sheet 1
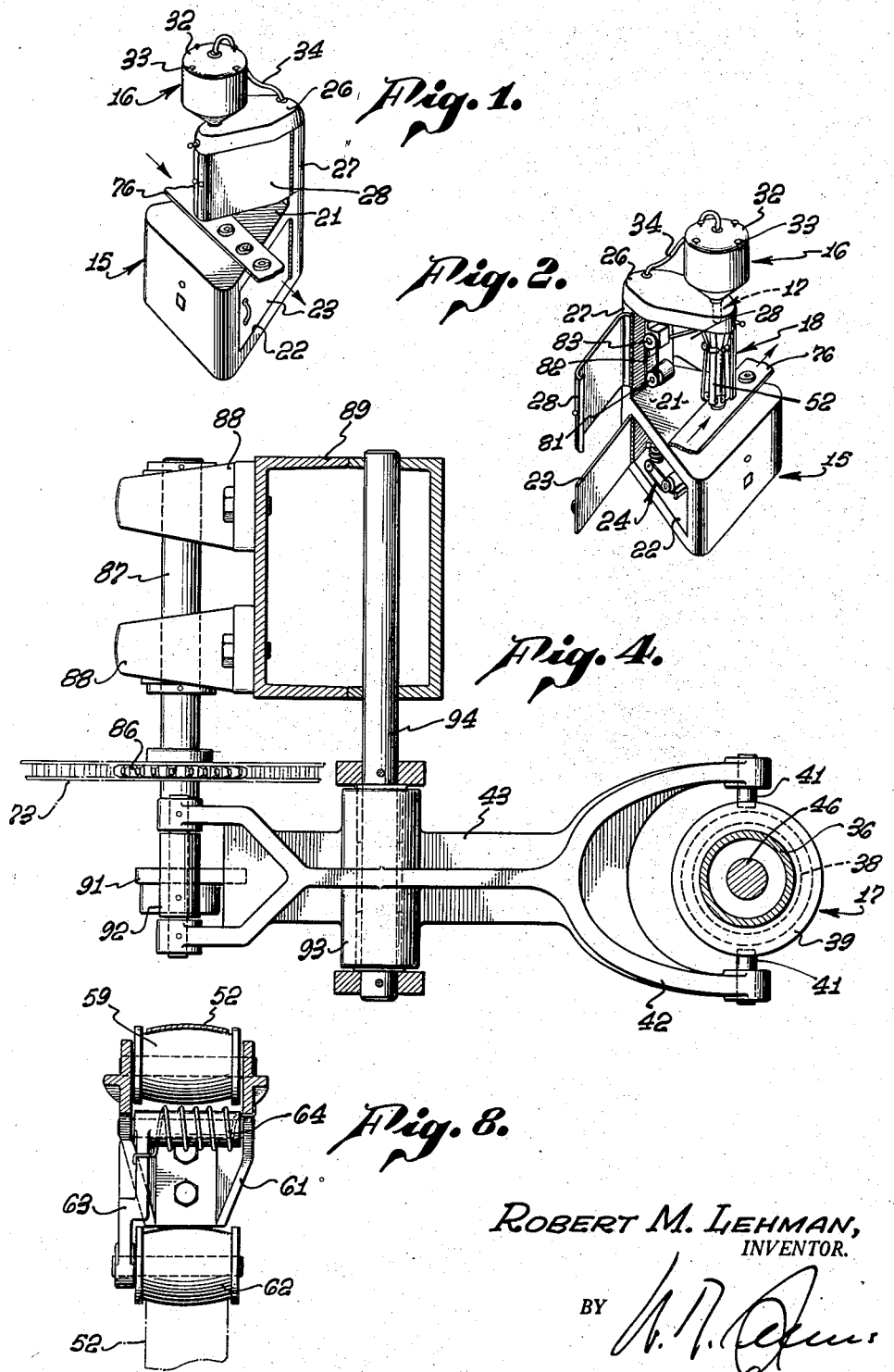
ROBERT M. LEHMAN,
INVENTOR.
BY
ATTORNEY.

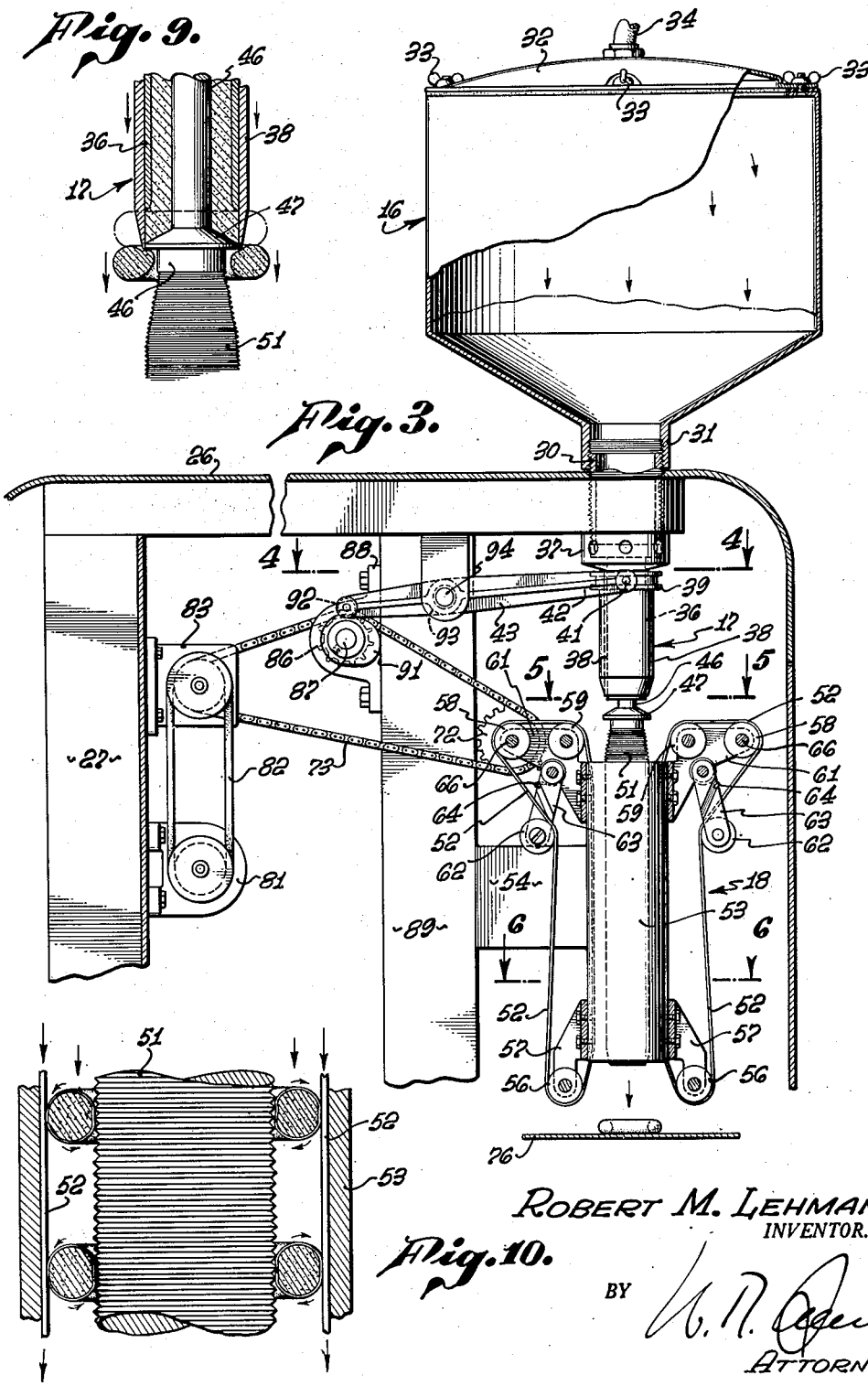

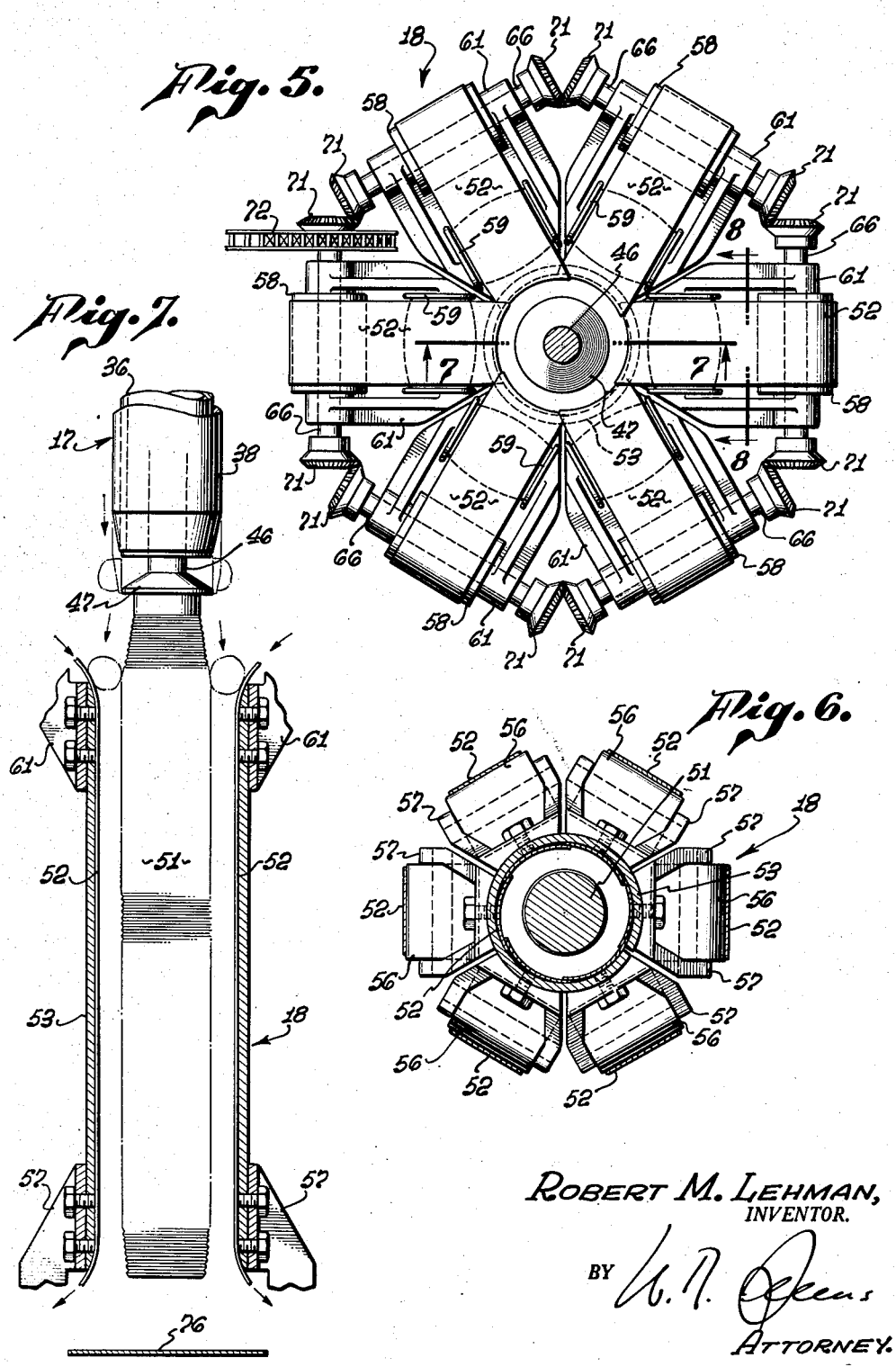

Patented Sept. 23, 1952

2,611,329

UNITED STATES PATENT OFFICE 2,611,329

METHOD AND MACHINE FOR MAKING DOUGHNUTS AND THE LIKE

Robert M. Lehman, Pasadena, Calif.

Application March 5, 1949, Serial No. 79,839

9 Claims. (Cl. 107—54)

The present invention relates to an apparatus and a method for making raised doughnuts and similar food products. More specifically the invention comprises a doughnut-making machine in which the dough is formed into rings and treated to provide an exterior "skin" prior to being fed to the subsequent steps of the treating process.

In the making of doughnuts and similar fried foods dough is first made into rings which are then passed through a series of steps in which they are treated to produce the finished product. It has been found that the highest quality of product is obtained only when the exterior surface of the dough ring is provided with what in effect amounts to a skin. The skin, so-called, is the external surface which differs from the mass of the dough in that it comprises a thin pliable sheet or cohesive layer of greater adhesive characteristics which serves to seal the contained body of dough and to prevent the escape of generated gases. In the making of ordinary bread the kneading action provides such a skin but in the making of circular ring raised doughnuts heretofore there has been no satisfactory method by which the skin can be provided and its absence results in a product of inferior quality.

By the present invention dough from a storage container is formed automatically into rings which are thereupon processed as to provide a skin upon their exterior surfaces so that when passed through the subsequent steps of the doughnut-making process they are in possession of that essential factor and a superior product results.

With an appreciation of the problems which are inherent in the food-processing field and particularly in the field of making raised doughnuts and similar products it is an object of the present invention to provide a new and improved process in which dough rings are treated to provide an exterior skin or covering.

It is another object of the invention to provide a doughnut machine in which measured quantities of dough are formed into rings and immediately subjected to a rolling action to provide a skin.

Another object of the invention is to provide a doughnut-making machine in which dough rings are rolled along a stationary mandrel, each transverse section of the ring rolling about its own midpoint to accomplish a kneading action producing a skin on its surface.

Still another object of the invention is to provide a doughnut-making machine in which dough rings are rolled along the roughened surface of a mandrel, characterized by its inherent non-sticky surface, by means of continuous, overlapping, and encircling conveyer belts which effect a rolling action to provide a skin.

A still further object of the invention is to provide a doughnut machine which is relatively economical to manufacture and in which dough is forced by air pressure from a container through a measuring and ring-forming unit to be acted upon by a skin-forming unit from which it passes onto a conveyer belt to be transported to the next step of the doughnut-making process.

These and other more specific objects will appear upon reading the following specification and claims and upon considering in connection therewith the attached drawings to which they relate.

Referring now to the drawings in which a preferred embodiment of the invention is illustrated:

Figure 1 is a view in perspective of an embodiment of the apparatus constructed in accordance with the present invention;

Figure 2 is a second view in perspective of the apparatus of Figure 1 showing the body side plates pivoted to open position;

Figure 3 is an enlarged vertical section through the dough-treating parts of the apparatus;

Figure 4 is a horizontal section looking in the direction of the arrows upon the line 4—4 of Figure 3 and illustrates the actuating means for the sleeve by which measured quantities of dough are cut off to form rings;

Figure 5 is a horizontal section upon the line 5—5 of Figure 3 looking downwardly upon the skin-forming unit comprising the driven conveyer belts which converge in overlapping relationship to advance the dough rings along the stationary mandrel;

Figure 6 is a horizontal section upon the line 6—6 of Figure 3 through the skin-forming unit;

Figure 7 is a vertical section through the skin-forming unit upon the line 7—7 of Figure 5;

Figure 8 is a view looking in the direction of the arrows upon the line 8—8 of Figure 5 and shows a belt-tensioning means of which there is one cooperating with each belt of the skin-forming unit;

Figure 9 is a vertical section through the lower end of the ring-forming unit with the cut-off sleeve in its severing position with a dough ring advancing toward the mandrel of the skin-forming unit; and Figure 10 is a vertical section through a central portion of the skin-forming unit and illustrates the travel of several dough rings between the mandrel and the traveling conveyor belts.

Referring again to the drawings, and to Figures 1 and 2 in particular, the apparatus constructed in accordance with the present invention is illustrated and is seen to comprise the following generally indicated parts: an exterior body or chassis 15, a dough storage unit 16, a ring-forming unit 17, and a skin-forming unit 18. The exact contour and shape of chassis 15 is not of the essence but the design illustrated is advantageous because of its compactness. A table top 21 overlies a compartment 22 which is provided at its sides with pivoted hinged doors 23 and which serves as the housing for a conventional motor compressor unit 24. An overlying head 26 extends over the table 21 from a rear wall 27, and a pair of hinged doors 28 pivoted to the latter are adapted to swing between open and closed positions, illustrated respectively in Figures 2 and 1, to form in the latter relationship an enclosure or compartment between the table and the head.

The dough storage unit 16 is seen to be mounted on the head 26 and to be positioned at its forward extremity. It comprises a cylindrical vessel formed with a frusto-conical converging bottom wall opening into an outlet 31 connected to an externally threaded conduit 30 which extends downwardly through the head. The storage vessel is normally sealed in air-tight relationship by a removable cover 32 retained by wing nuts 33 positioned around its periphery. Suitable gaskets can be provided to insure the air-tight relationship. A flexible air conduit or hose 34 extends from cover 32 to head 26 and passes downwardly through the rear wall 27 to connect to the air compressor unit 24. With a mass of dough in storage unit 16 above the outlet 31 the presence of air under pressure thereabove forces the dough downwardly through the outlet and the connected conduit 30.

Dough forced downwardly from the storage unit is formed into circular rings by the ring-formed unit, indicated generally by the reference character 17. That unit comprises a vertically extending cylindrical nozzle 36 the enlarged upper end 37 of which is threaded internally and seats the lower end of dough conduit 30. A cut-off or cutting sleeve 38 is mounted slidably upon the exterior of nozzle 36, its lower end being thinned to provide a circular cutting edge. The upper end of sleeve 38 fixedly carries a ring 39 a circumferential groove in which seats the radially extending pins 41 carried by a yoke 42 at the end of centrally pivoted lever 43. Sleeve 38 is vertically slidable on nozzle 36 between an upper position in which its lower end is above the lower end of nozzle 36 and a lowered position in which its lower end extends below the nozzle.

A cylindrical post 46 suitably supported and extended longitudinally in nozzle 36 is formed at its lower end with a frusto-conical abutment 47. The largest diameter of abutment 47 is substantially equal to the internal diameter of cut-off sleeve 38 so that the latter in its downward travel moves closely thereagainst and therebeyond, as illustrated in Figure 9. The frusto-conical abutment 47 limits the downward displacement of the dough and directs it outwardly, the post 46 having already formed a hollow center therein as it moved through the nozzle. In the disclosed embodiment the post 46 and frusto-conical abutment 47 are shown connected to the upper end of the mandrel 51 which has a cylindrical portion and which forms a part of the skin-forming unit 18. It is to be understood, however, that this is not necessarily the case.

The skin-forming unit 18 is positioned directly below the nozzle 36, its mandrel 51 being in alignment therewith, as is clearly illustrated in Figures 3 and 7. Unit 18 comprises, in addition to mandrel 51, a plurality of endless conveyor belts 52 which travel downwardly parallel to the mandrel in a guide cylinder 53 supported rigidly upon body 15 by a bracket 54. As is most clearly illustrated in Figure 6 the conveyer belts 52 conform to the inner curvature of cylinder 53 and their adjacent edges overlap slightly. Each belt passes outwardly from the lower end of guide cylinder 53 downwardly and around an idler roller 56 carried by a bracket 57 fixed to the lower end of the cylinder. Each belt then extends upwardly at the side of the cylinder, around a drive roller 58, and then across and over second idler roller 59 from which it passes downwardly and into the guide cylinder. Rollers 58 and 59 are mounted in pairs between the spaced arms of brackets 61 secured to the upper end of the guide cylinder. A suitable tension is maintained on the belts by individual take-ups comprising in each case a roller 62 carried by an arm 63 pivoted to bracket 61. A coil spring 64 at the pivotal axis of each arm 63 exerts a pivoting force urging the roller 62 toward the guide cylinder 53 so that it takes up any slack in the adjacent conveyer belt 52 which it contacts. As is illustrated most clearly in Figure 5 each roller 58 is carried by a shaft 66 at each end of which is fixed a gear 71 meshing with a similar gear upon the end of an adjacent shaft 66. As the brackets 61 are spaced circumferentially around the guide cylinder 53 and extend outwardly therefrom, and as the shafts 66 are all at the same distance from the cylinder, the various shafts in effect form the chords of a circle. One of the shafts 66 carries a sprocket 72 driven by a chain 73, as will be described, and its rotation effects the rotation of all the shafts 66 and of the rollers 58 carried thereby. As all of the rollers 58 are of the same diameter it follows that the belts 52 will travel at the same rate of speed.

The mandrel 51, to which reference has previously been made, is shown as dependent from the post 46 forming a part of ring-forming unit 17. It has a cylindrical portion and an exteriorly roughened surface which may comprise adjacent circular indentations or grooves. For its maximum length within the guide cylinder 53, in which it is surrounded by conveyer belts 52, the mandrel has a diameter which is substantially equal to the maximum diameter of frusto-conical abutment 47. At its upper end immediately below the abutment it is smaller in diameter and increases gradually so that the dough ring which has been severed by the downward movement of the cutting sleeve 38 may fall substantially freely until it contacts the encircling belts 52. Its lower end is also gradually reduced in diameter so that the doughnut ring which has traveled downwardly with the belts 52 may fall freely onto an underlying conveyer belt 76 to be conveyed to the next stage in the doughnut-making process.

The vertically reciprocating cutting sleeve 38 of ring-forming unit 17 and the traveling conveyer belts 52 of the skin-forming unit 18 may be separately actuated or may be driven by a single power unit as in the illustrated form of the invention. According to that form a single electric driving motor 81 is connected by a belt 82 to a speed-reducing unit 83. The latter drives an endless chain 73 which encircles the sprockets 72, carried by a conveyer belt shaft 66 as previously described, and also passes over a second sprocket 86 carried by a shaft 87 supported by a pair of brackets 88 on an upright 89 of the chassis. Shaft 87 also carries a cam 91 which abuts a sleeve roller 92 positioned between the bifurcated ends of arm 43. The latter is pivotally mounted by an integral journal 93 upon a shaft 94 extending parallel to shaft 87 and carried by upright 89. The rotation of shaft 87 under a force received by sprocket 86 from the chain 73 effects the rotation of cam 91 which in turn forces the adjacent contacting roller 92 upwardly. Thereupon the opposite end of arm 43 carrying the yoke 42 and pins 41 pivots downwardly carrying with it the cutting sleeve 38. The speed of travel of the chain 73 is gauged so that sleeve 38 will complete a cycle of movement at a rate such that the expelled end of the dough cylinder will be cut off upon reaching a predetermined size. The rate of extrusion of the dough, of course, can be controlled by the pressure of the air within the container 16.

The operation of the doughnut apparatus constructed in accordance with the present invention is as follows. A batch of dough is placed within the storage unit 16 and the cover 32 is attached in pressure-tight relationship by the wing nuts 33. The container may be of relatively great size, and in fact it is within the scope of the invention that it should be fed continuously or at intervals from an outside source to make unnecessary the removal of the cover plate and its replacement. Any conventional means for forcing dough into the container under pressure is acceptable for that purpose. The air compresser unit 24 is placed in operation and the air in storage unit 16 is placed under pressure so that the dough which closes the outlet 31 is forced downwardly and through nozzle 36. The rate at which the dough is expelled can be varied by controlling the air pressure in unit 16 by conventional means which may include a pressure release valve or a suitable pressure control at the compressor unit 24. The electrical driving motor 81 is energized and its power transmitted through the endless belt 82 and speed-reducing unit 83 to the power-transmitting chain 73 which, as described, encircles the sprockets 72 and 86. The driving rollers 58 are actuated whereupon the conveyer belts 52 held thereagainst by the take-ups 63 travel downwardly through the guide cylinder 53 in spaced concentric relationship to the mandrel 51, as illustrated most clearly in Figure 10. The rotation of sprocket 86 is effective to cause the rotation of shaft 87 and the eccentric cam 91 carried thereby, whereupon the sleeve-contacting end of the centrally pivoted lever arm 43 is forced downwardly once during each complete revolution of the cam.

The pressure of the air within storage unit 16 is so gauged that a predetermined volume of dough is forced from the nozzle 36 and directed outwardly by the frusto-conical abutment 47 in that time period required for the cam 91 to make one complete revolution and the cutting or cut-off sleeve 38 to travel one complete cycle. A complete cycle of the sleeve is defined as its displacement from its uppermost position downwardly through its ring-severing position to its lowermost and its return to its uppermost position. In Figures 3 and 7 cut-off sleeve 38 is shown in its uppermost position and in the latter figure the quantity of dough extruded is illustrated in dotted lines and has reached a size suitable to be severed. At that point the sleeve 38 is being forced downwardly by its actuating lever 43 which is itself under the control of the cam 91. The sharpened lower end of the cutting sleeve cuts through the extruded dough and effects a shearing action with the cooperation of abutment 47, in the manner clearly illustrated in Figure 9. Sleeve 38 then continues its downward movement forcing the newly cut ring over the reduced upper end of mandrel 51 and into contact around its exterior with the belts 52. The downward movement of the latter rolls the ring downwardly along and around mandrel 51. The roughened exterior of the latter prevents the ring from sliding so that instead each radial section rolls upon itself around its own imaginary center, as illustrated by the small arrows in Figure 10. As the circumference of the ring surface is greater around its exterior than around its interior it follows that the dough surface is alternately stretched and compressed and a kneading action effected. This action continued for the length of the mandrel 51 provides a "skin" which seals the interior of the dough ring and prevents the escape of generated gases.

The mandrel 51 is preferably made of a material characterized by its non-sticky quality. Such materials are now commercially available upon the market and one is known as "Teflon." Any material, however, which has no deleterious effect upon comestibles and which is characterized as described will be suitable. In the event such material cannot be obtained, of course, any tendency of the dough ring to adhere to the mandrel can be avoided by dusting flour upon the rings as they enter the upper end of the skin-forming unit.

After traversing the length of the skin-forming unit 18 the individual doughnut rings, now provided with exterior skins, fall flat upon the underlying traveling conveyer belt 76 by which they are conveyed to the next step in the doughnut-making process.

The ring-severing action effected by the unit 17 is repeated rapidly so that rings travel in spaced relationship down the skin-forming unit 18 in the relationship illustrated in Figure 10. The exact speed of operation is not, of course, of the essence but for purposes of example such a machine is capable of producing 180 dozen doughnut rings per hour. The cutter sleeve 38 may, for example, be reciprocated 36 times per minute. These figures are only illustrative, however.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a machine for making doughnuts of the type in which dough in ring form is moved therein, a rough-surfaced mandrel encircled by said rings, and means having a flat ring-contacting surface to advance said rings along said mandrel with each radial section rolling therealong to form a skin.

2. In a machine for making doughnuts of the type in which dough in the form of rings is moved therein, a mandrel adapted to be encircled by said rings having a vertical cylindrical portion with a roughened surface to prevent said rings from sliding therealong, and smooth means adapted to contact without breaking the surface of the ring moving in spaced concentric relationship to said mandrel to contact and to advance said rings therealong with each radial section of each ring rolling upon itself.

3. In a machine for making doughnuts of the type in which dough in the form of a ring is moved therein, a mandrel adapted to be closely encircled by said rings having a cylindrical portion its surface roughened by minute encircling grooves to prevent said rings from slipping therealong, and a plurality of conveyer belts extended longitudinally of and adjacent said mandrel to advance said rings therealong, said belts being so spaced from said mandrel that said rings are compressed thereagainst and each radial section of each ring rolls upon itself and in contact with the surface of said mandrel.

4. In a machine for making doughnuts of the type in which dough in the form of a ring is moved therein, a mandrel adapted to be closely encircled by dough rings having a cylindrical portion with a roughened surface characterized by its inherent permanent lack of affinity for dough, a guide cylinder concentric to said mandrel, and a plurality of flat conveyer belts conforming to the inner curvature of said guide cylinder with their adjacent edges overlapped to form a traveling cylinder to move said rings along said mandrel with each radial section of each ring rolling upon itself.

5. In a doughnut-making machine or the like, a skin-forming unit comprising a stationary vertical mandrel formed exteriorly with circumferential grooves to provide a friction surface adapted to seat an enclosing ring of dough, a guide cylinder concentric to said mandrel, a plurality of flexible conveyer belts extended longitudinally through said guide cylinder and conforming to the curvature of the inner surface thereof, said belts being spaced from said mandrel by the radial thickness of said ring of dough approximately and being adapted to contact without breaking the skin of a dough ring enclosing said mandrel, rollers at the opposite ends of said guide cylinder movably supporting said belts, means interconnecting rollers at one end of said cylinder for conjoint rotation to insure the same speed of travel for said belts, and means to rotate said interconnected rollers.

6. In a doughnut-making machine or the like, a skin-forming unit comprising a stationary vertical mandrel formed exteriorly with circumferential grooves to provide a friction surface adapted to seat an enclosing ring of dough, a guide cylinder concentric to said mandrel, a plurality of flexible smooth-surfaced uninterrupted conveyer belts extended longitudinally through said guide cylinder and conforming to the curvature of the inner surface thereof, said belts being adapted to contact without breaking the skin of a dough ring enclosing said mandrel, rollers at the opposite ends of said guide cylinder movably supporting said belts, means interconnecting rollers at one end of said cylinder for conjoint rotation to insure the same speed of travel for said belts, a chain-actuated sprocket connected to said interconnected rollers to receive a rotating force, and spring-pressed take-up rollers in contact with said belts between said rollers at opposite ends of said cylinder.

7. A method of making raised doughnuts comprising the steps of forcing dough from a source as a continuous cylinder, severing the end of said cylinder to form a ring, and applying frictional force only to the exterior surface of said ring to roll each transverse section of said ring about its own imaginary center to form an unbroken skin on said ring.

8. A method of making doughnuts comprising the steps of placing a body of dough under pressure, projecting said dough from said body as a continuous cylinder, deflecting the end of said cylinder outwardly and severing it to provide a ring, and by the application of exterior frictional force and without penetration rolling said ring along a mandrel extended through its center to form a skin thereon.

9. A method of making doughnuts comprising the steps of creating a greater-than-atmosphere air pressure over a batch of dough, projecting said dough by said pressure from said batch in the form of a cylinder, deflecting the advancing end of said cylinder outwardly and severing it by a cutting action in the direction of the longitudinal axis of said cylinder, and rolling said ring along a mandrel extended through its center by a traveling member advancing parallel to said mandrel and making frictional contact only with said ring.

ROBERT M. LEHMAN.

REFERENCES CITED

The following references are of record in the file of this patent:

UNITED STATES PATENTS

| Number | Name | Date |
|---|---|---|
| 923,360 | Kruse | June 1, 1909 |
| 1,552,430 | Gendler | Sept. 8, 1925 |
| 1,559,729 | Morris | Nov. 3, 1925 |
| 1,755,921 | Gendler | Apr. 22, 1930 |